Patented June 10, 1952

2,599,544

UNITED STATES PATENT OFFICE 2,599,544

STABILIZATION OF UNSATURATED ORGANIC MATERIAL-SULFUR DIOXIDE RESINS WITH ELEMENTAL SULFUR OR INORGANIC SULFIDES

Willie W. Crouch and John F. Howe, Bartlesville, Okla., assignors to Phillips Petroleum Company, a corporation of Delaware No Drawing. Application January 31, 1951, Serial No. 208,853

18 Claims. (Cl. 260—45.7)

1

This invention relates to a method for producing thermally stable olefin-sulfur dioxide resins. In one aspect this invention relates to incorporating elemental sulfur or inorganic sulfides in an olefin-sulfur dioxide resin. In another aspect this invention relates to a process of producing a thermally stable olefin-sulfur dioxide resin that is free of unpleasant odors. In still another aspect this invention relates to a method of shortstopping the polymerization of an olefin-sulfur dioxide resin so that a thermally stable resin results. In still another aspect this invention relates to a method for shortstopping the polymerization of an olefin-sulfur dioxide resin.

Olefin-sulfur dioxide resins often cannot be employed satisfactorily for the production of molded articles because of their limited thermal stability. On being exposed to elevated temperatures, the original glass-like resin evolves sulfur dioxide, unsaturated organic compounds and various volatile decomposition products of unpleasant odor, expanding into a porous, voluminous mass having a puffy structure.

Various so-called stabilizing agents have been suggested as addition compounds for the olefin-sulfur dioxide resins. These addition compounds include organic solvent liquids and vapors, acrylic acid esters, vinyl acetate and acylating agents which supposedly act to remove occluded sulfur dioxide. When heated to the elevated temperatures necessary for injection molding operations, such as 300° F. or higher, these stabilizing agents become essentially ineffective and the resins containing them are substantially as unstable as in their absence. More recently it has been disclosed that sulfhydryl compounds such as mercapto ethanol, thio glycollic acid, benzyl mercaptan and the like impart thermal stability to said resins. However, these compounds are malodorous and are undesirable in commercial products. In addition those compounds are often not readily available.

It has now been discovered that olefin-sulfur dioxide resins can be rendered highly resistant to thermal decomposition when sulfur or an inorganic sulfide is incorporated therein as a stabilizing agent. When added to an olefin-sulfur dioxide resin according to the method of our invention, sulfur or an inorganic sulfide imparts excellent thermal stability to said resins and in some instances completely inhibits their decomposition at molding temperatures.

According to this invention there is provided a process for the production of a stable olefin-sulfur dioxide resin which comprises the step of adding to the said resin, sulfur or an inorganic sulfide during the polymerization reaction or after the reaction has been completed. When added to the polymerization reaction the sulfide is admixed with the acid latex. Preferably the sulfide is added to a resin when said resin is dispersed in an aqueous medium containing sufficient sulfur dioxide to produce a pH of 5 or lower. When added after the completion of the reaction the sulfur or sulfide can be incorporated into the resin by simple admixture or by precipitation or other means, whether physical or chemical.

Both soluble and insoluble sulfides are operable. The water soluble compounds are generally preferred and provide better stabilization than the water insoluble compounds. Typical sulfides applicable to the method of the present invention include hydrogen sulfide, sodium, zinc, barium, cadmium, tin, and ammonium sulfides. Sodium hydrosulfide, potassium hydrosulfide, ammonium hydrosulfide and the like are also applicable.

In order to effect the desired degree of stabilization from 0.05 to 10, preferably 0.5 to 5 weight per cent, based on the weight of the resin, of sulfur or inorganic sulfide is incorporated in the molding composition employed.

Sulfur can be incorporated into the olefin-sulfur dioxide resin in a number of ways, the important factor being that said sulfur be thoroughly and intimately mixed with the resin. Thus, for example, finely-divided sulfur can be added to the finely-divided, dry resin by distributing the desired quantity evenly therein by means of a suitable mixing device. Sulfur can also be added as an aqueous slurry to the finely-divided, dry resin and thoroughly mixed therewith followed by suitable removal of water. It has usually been preferred to add an aqueous slurry of sulfur to a dispersion of the resin in the latex in which it has been prepared and both the resin and admixed sulfur separated therefrom simultaneously. When operating in this preferred manner, sulfur is added to a resin latex produced in an emulsion polymerization system just after the polymerization has been completed and excess sulfur dioxide vented from the reactor. Addition of sulfur can also be made at other points in the manipulative process as will be apparent to one skilled in the art. Advantage can be taken of any sulfur which may occur in situ in the latex or resin. Sulfur is applicable for the stabilization of olefin-sulfur dioxide resins produced by any method such as polymerization in excess sulfur dioxide or acetone or other suitable solvent. It has usually been preferred to employ resins produced by emulsion polymerization methods, more particularly resins produced by the method disclosed in co-pending application Serial No. 8,755, filed February 16, 1948, by Willie W. Crouch and Ernest W. Cotten. Organic compounds which enter into the formation of such resins include mono-olefins, cyclo-olefins, substituted aliphatic olefins such as styrene, di-olefins such as butadiene, isoprene, cyclohexadiene, and the like, acetylenes and polyfunctional unsaturated compounds such as allyl alcohol, vinyl acetate, allyl ethyl ether, o-allylanisole, o-allylphenol, p-bromoallylbenzene, methyl undecylenate, undecylenyl alcohol, undecylenic acid, etc. The process comprises reacting the unsaturated compound and sulfur dioxide in aqueous emulsion in the presence of suitable catalysts and emulsifying agents.

To accomplish the desired results of the present invention, when sulfides are used instead of sulfur, the addition of the sulfide to the resin is preferably made when the resin is in the acid latex state. This is most conveniently done after polymerization is completed and excess sulfur dioxide has been vented from the reactor. At this point the latex contains dissolved sulfur dioxide and is highly acidic.

It has also been discovered, according to this invention, when sulfur or a sulfide is added to an olefin-sulfur dioxide polymerization recipe before the reaction has been allowed to go to completion, that the polymerization is stopped. Thus the additives of the present invention provide a means for controlling the degree of conversion in an olefin-sulfur dioxide polymerization reaction as well as a means for the stabilization of such resins as are thus prepared.

PREPARATION OF 1-BUTENE-SULFUR DIOXIDE RESIN

An olefin-sulfur dioxide resin was prepared using the following emulsion recipe in a stainless steel autoclave.

| | Parts by weight |
|---|---|
| Commercial 1-butene [1] | 57.7 |
| Sulfur dioxide | 88.3 |
| Water | 180 |
| Ammonium nitrate | 0.5 |
| Maprofix MM [2] | 0.6 |

[1] The commercial 1-butene had the following composition:

| | Mol per cent |
|---|---|
| 1-butene | 63.2 |
| 2-butene-cis | 1.0 |
| 2-butene-trans | 12.5 |
| n-Butane | 13.4 |
| Isobutane | 4.6 |
| $C_3$ | 1.0 |
| Isobutylene | 3.6 |
| Butadiene | 0.7 |

[2] Sodium laurylsulfate dispersing agent commercially available in the form of a paste containing about 60 per cent solids.

The polymerization was conducted for a period of seven hours at a temperature of 100° F. A conversion of 95 per cent was reached.

At the end of the reaction period, the reactor was opened and excess sulfur dioxide vented therefrom. The latex was coagulated either with magnesium sulfate or with methanol; the resin was then removed by filtration and dried in air at 130 to 150° F. for 16 hours.

Example I

Varying amounts of powdered sulfur in the form of a slurry in water were added to portions of acid latex prepared in the manner described above and thoroughly commingled therewith. The latex was then stripped of dissolved sulfur dioxide and coagulated with an aqueous solution of magnesium sulfate; the resin was removed by filtration and dried.

Resins so prepared were tested for thermal stability in the following manner:

Weighed portions of resin were placed in suitable test tubes which were then partially immersed in a constant temperature bath held at 325±2° F. for varying periods. Per cent loss in weight of the resin was determined at the end of said selected heating periods. The per cent loss in weight provides a measure of the thermal decomposition which took place. Controls and tests were run simultaneously.

| | Per Cent Loss in Weight at End of $x$ Hours Heating at 325±2° F. | | |
|---|---|---|---|
| | 0.5 | 1 | 3 |
| Sample I: | | | |
| Control | 3.4 | 6.5 | 11.4 |
| 0.1% sulfur, based on weight of dry resin | 1.40 | 3.1 | 4.8 |
| 0.3% sulfur, based on weight of dry resin | 0.70 | 1.24 | 3.0 |
| 0.5% sulfur, based on weight of dry resin | 0.55 | 0.99 | 2.70 |
| (Latices coagulated with methanol) | | | |
| Sample II: | | | |
| Control | 4.6 | 7.6 | 12.3 |
| 2.0% sulfur, based on weight of dry resin | 0 | 0.02 | 0.53 |
| (Latex coagulated with magnesium sulfate) | | | |

The results show that powdered sulfur substantially reduces thermal decomposition of a typical olefin-sulfur dioxide resin when added to an acid latex in extremely small amounts. In larger amounts, elemental sulfur completely inhibits thermal decomposition of an olefin-sulfur dioxide resin at 325° F. for 0.5 hours and substantially reduces thermal decomposition for periods of 1 and 3 hours.

Example II

To demonstrate the operability of powdered sulfur as a thermal stabilization agent when added to a dry resin, the following run was made. The resin was prepared from 1-butene [1] according to the method described before. Sulfur was intimately commingled with the dry resin by mixing. Results of thermal stability tests are recorded below.

| | Per Cent Loss in Weight at End of $x$ Hours Heating at 325° F. | | |
|---|---|---|---|
| | 0.5 | 1 | 3 |
| 0.5% sulfur added to dry resin | 0.99 | 1.71 | 3.10 |
| Control | 5.0 | 8.2 | 15.4 |
| (Resins coagulated from latex with methanol) | | | |

The results show that the addition of powdered sulfur to a finely divided dry resin effectively reduces thermal decomposition of a typical olefin-sulfur dioxide resin.

Example III

A further series of tests was made wherein hydrogen sulfide was run into acid latex prepared in the manner described before to provide varying amounts of free sulfur. Results of thermal decomposition tests made on the resins re- ---
[1] Commercial butene as described herein.

covered from treated latices and on untreated control are recorded in the following table.

|  | Per Cent Loss in Weight at End of $x$ Hours Heating at 325° F. | | |
| --- | --- | --- | --- |
|  | 0.5 | 1 | 3 |
| Control | 3.4 | 6.5 | 11.4 |
| 0.5% sulfur. Hydrogen sulfide added to acid latex to provide 0.5% sulfur based on weight of dry resin | 0.57 | 1.05 | 2.6 |
| 1.0% sulfur. Hydrogen sulfide added to acid latex to provide 1.0% sulfur based on weight of dry resin | 0.37 | 0.72 | 1.95 |

The results show that hydrogen sulfide substantially reduces thermal decomposition of a 1-butene sulfur dioxide resin when added to the sulfur dioxide containing latex thereof. Results closely parallel those provided by the addition of a corresponding amount of powdered sulfur to an acid latex.

Example IV

Sodium sulfide was added to an acid latex of a 1-butene [1]-sulfur dioxide resin prepared as described before. Results of thermal decomposition tests made on the resin recovered from the treated sample and an untreated control are recorded in the following table.

|  | Per Cent Loss in Weight at End of $x$ Hours Heating at 325° F. | | |
| --- | --- | --- | --- |
|  | 0.5 | 1 | 3 |
| Control | 5.8 | 9.7 | 16.9 |
| 2% sodium sulfide based on weight of dry resin. Sodium sulfide added as aqueous solution to acid latex (Latex coagulated with magnesium sulfate.) | 0.59 | 1.09 | 2.41 |

The results show that sodium sulfide appreciably reduces thermal decomposition of a typical olefin-sulfur dioxide resin when added to the acid latex of said resin.

Example V

Latex prepared according to the procedure described before was employed in the following tests wherein various sulfides were added to the acid latex in an amount equal to 2% of the weight of the dry resin. Results of thermal decomposition tests made on the treated resins and an untreated control are recorded in the following table.

|  | Per Cent Loss in Weight at End of $x$ Hours Heating at 325° F. | | |
| --- | --- | --- | --- |
|  | 0.5 | 1 | 3 |
| Control | 4.4 | 7.2 | 13.1 |
| 2% zinc sulfide based on weight of dry resin. Zinc sulfide added to acid latex as wetted powder | 1.29 | 2.44 | 5.3 |
| 2% barium sulfide based on weight of dry resin. Barium sulfide added to acid latex as an aqueous solution | 0.21 | 0.55 | 1.49 |
| 2% cadmium sulfide based on weight of dry resin. Cadmium sulfide added to acid latex as a wetted powder | 3.2 | 5.6 | 11.2 |
| 2% ammonium sulfide based on weight of dry resin. Ammonium sulfide added to acid latex as an aqueous solution | 0.18 | 0.44 | 1.39 |
| 2% stannous sulfide based on weight of dry resin. Stannous sulfide added to acid latex as wetted powder (Latices coagulated with methanol) | 3.3 | 5.2 | 10.4 |

[1] Commercial butene as described herein.

The results show that zinc, stannous, barium, cadmium and ammonium sulfides are effective additives for controlling the thermal decomposition of a typical olefin-sulfur dioxide resin. Ammonium sulfide and barium sulfide were most effective. However, all compounds showed appreciable improvement over the untreated controls. It should be noted that ammonium sulfide and barium sulfide are water soluble and that zinc sulfide, stannous sulfide and cadmium sulfide are insoluble.

Example VI

A butene[1]-1-sulfur dioxide resin latex containing dissolved sulfur dioxide, was prepared as described before. Samples of the latex were treated with an aqueous dispersion of sodium tetrasulfide ($Na_2S_4$), stripped of sulfur dioxide, coagulated, washed and dried. Results of thermal decomposition tests on the recovered resin are shown in the following table:

|  | Per Cent Loss in Weight at End of $x$ Hours Heating at 325° F. | | |
| --- | --- | --- | --- |
|  | 0.5 | 1 | 3 |
| Control | 8.1 | 10.8 | 16.6 |
| 2.0% stabilizer concentration | 0.2 | 0.7 | 1.8 |
| 0.5% stabilizer concentration | 0.7 | 1.5 | 2.9 |
| (Latices coagulated with methanol) | | | |

Example VII

A run was made to demonstrate the shortstopping effect which sodium sulfide provides in an olefin-sulfur dioxide resin polymerization. The following recipe was employed:

| | Parts by weight |
| --- | --- |
| 1-butene [1] | 46.7 |
| Sulfur dioxide | 88.3 |
| Lithium nitrate (catalyst) | 0.50 |
| Water | 180 |
| Maprofix MM (sodium lauryl-sulfate wetting agent) | 1.0 |
| Shortstop, sodium sulfide | 0.25 |
| Reaction temperature 30° C. | |

The polymerization was started and allowed to proceed for 50 minutes. At the end of this period the polymerization was interrupted and a sample removed and the per cent conversion determined. The conversion was found to be 48.2%. The shortstop was added at this point and the polymerization was allowed to continue for an additional 6 hour period. The conversion was again determined and found to be 48.2%. The shortstop completely prevented further polymerization after its addition to the reaction recipe.

Example VIII

A resin was prepared according to the following recipe:

| Materials | Parts by Weight |
| --- | --- |
| 1-pentene | 46.7 |
| $SO_2$ | 88.3 |
| Maprofix MM | 0.6 |
| $NH_4NO_3$ | 0.5 |
| Water | 180 |

Conditions: Stainless steel autoclave reactor.
Temperature: 100° F.
Time: 11 hours.
Conversion: 98%.

[1] Commercial butene as described herein.

The resin was prepared from the latex and dried according to the conventional procedure. The stabilizers indicated in the table below were added and the per cent decomposition was determined at 325° F. (Latex coagulated with magnesium sulfate.)

|  | Per Cent Decomposition @ 325° F. at — | | |
|---|---|---|---|
|  | ½ hr. | 1 hr. | 3 hrs. |
| Control | 5.3 | 7.2 | 10.4 |
| 2% sulfur [1] | 0.9 | 1.2 | 1.7 |
| 0.5% sulfur [1] | 0.9 | 1.4 | 2.1 |

[1] Dry resin mixed with sulfur.

Example IX

A cyclohexene-sulfur dioxide resin was prepared according to the following recipe:

Charge: Parts by weight
- Cyclohexene _____ 56.8
- $SO_2$ _____ 78.2
- $H_2O$ _____ 180.0
- Maprofix MM _____ 1.00
- $NH_4NO_3$ _____ 0.50

Reaction temperature: 10° C.
Reaction time: 6 hours.
Conversion: 88.7% of cyclohexene charged.

The resin was coagulated by adding methanol to the stirred latex. The resin was recovered by filtering, washing twice with distilled water, and drying in an air draft oven for 24 hours at 130–140° F. The decomposition for the control and stabilized resins are shown in the following table:

| Stabilizer | Per Cent Decomposed at 325±2° F.— | | |
|---|---|---|---|
|  | ½ hr. | 1 hr. | 3 hrs. |
| None (control) | 3.8 | 6.3 | 15.3 |
| 2% sulfur [1] | 1.9 | 3.3 | 8.4 |

[1] Dispersed sulfur in ½% Orvus solution; added this solution to stirred latex. Coagulated latex and filtered, washed, and dried resin by same method as control. Orvus is a trade name for sodium lauryl sulfate wetting agent.

Example X

A butadiene-sulfur dioxide resin was prepared using the following recipe:

Charge: Parts by weight
- 1,3 butadiene _____ 46.7
- $SO_2$ _____ 88.3
- $H_2O$ _____ 180.0
- Maprofix MM _____ 2.00
- $NH_4NO_3$ _____ 0.50

Reaction temperature: 30° C.
Reaction time: 4 hours.
Conversion: 100% of 1,3 butadiene.

The latex was totally coagulated at the end of the reaction period, and consequently no coagulant was added. The resin was filtered, washed three times with distilled water, and dried in an air draft oven at 130–140° F. for 24 hours. The decomposition of the stabilized and unstabilized resin is shown in the following table:

| Stabilizer | Per Cent Decomposed at 467±2° F.— | | |
|---|---|---|---|
|  | ½ hr. | 1 hr. | 3 hrs. |
| None (control) | 15.2 | 28.2 | 47.2 |
| 2% sulfur [1] | 13.1 | 21.3 | 36.3 |

[1] Colloidal sulfur was dispersed in ½ per cent Orvus solution; this solution added to coagulated latex and dispersed by grinding in a mortar. Remaining treatment was same as control.

Reasonable variation and modification are possible within the scope of the foregoing disclosure and the appended claims to the invention, the essence of which is that the addition of elemental sulfur or inorganic sulfides to an olefin-sulfur dioxide resin results in the production of a thermally stable resin and that these agents will shortstop the polymerization reaction.

We claim:

1. In the process of producing a stable olefin-sulfur dioxide resin the step which comprises admixing a material selected from a group consisting of elemental sulfur and an inorganic sulfide with said resin during its preparation.

2. In the process of producing a stable olefin-sulfur dioxide resin the step which comprises admixing a material selected from a group consisting of elemental sulfur and an inorganic sulfide with an acid latex of said resin.

3. In the process of producing a stable olefin-sulfur dioxide resin the step which comprises adding a material selected from a group consisting of elemental sulfur and an inorganic sulfide to the polymerization step at a predetermined stage of the polymerization reaction thereby stopping the polymerization reaction and producing a thermally stable resin.

4. The process of claim 1 wherein the material is elemental sulfur.

5. The process of claim 1 wherein the material is hydrogen sulfide.

6. The process of claim 1 wherein the material is ammonium sulfide.

7. The process of claim 1 wherein the material is barium sulfide.

8. The process of claim 1 wherein the material is sodium sulfide.

9. The process of claim 1 wherein the material is a tin sulfide.

10. A thermally stable olefin-sulfur dioxide resin composition comprising an olefin-sulfur dioxide resin having incorporated therewith as stabilizing agent a material selected from the group consisting of elemental sulfur and an inorganic sulfide.

11. The composition of claim 10 wherein the stabilizing agent is elemental sulfur.

12. The composition of claim 10 wherein the stabilizing agent is hydrogen sulfide.

13. The composition of claim 10 wherein the stabilizing agent is ammonium sulfide.

14. The composition of claim 10 wherein the stabilizing agent is barium sulfide.

15. The composition of claim 10 wherein the stabilizing agent is sodium sulfide.

16. The composition of claim 10 wherein the stabilizing agent is a tin sulfide.

17. In a method for producing a stable heteropolymeric resin, formed by the interaction of sulfur-dioxide and an unsaturated organic material, in which the unsaturation is between two adjacent carbon atoms and which will polymerize with sulfur-dioxide to form said resin, the improvement which comprises admixing a material selected from the group consisting of elemental sulfur and an inorganic sulfide with said resin during its preparation.

18. A thermally stable heteropolymeric resin, formed by the interaction of sulfur-dioxide and an unsaturated organic material, in which the unsaturation is between two adjacent carbon atoms and which will polymerize with sulfur-dioxide to form said resin and having incorporated therewith as a stabilizing agent a material selected from the group consisting of elemental sulfur and an inorganic sulfide.

WILLIE W. CROUCH.
     JOHN F. HOWE.

No references cited.